(12) United States Patent
Okamoto et al.

(10) Patent No.: US 7,604,078 B2
(45) Date of Patent: Oct. 20, 2009

(54) ELECTRIC BICYCLE

(75) Inventors: Ikuo Okamoto, Shizuoka-ken (JP); Toshiki Hirata, Shizuoka-ken (JP)

(73) Assignee: Yamaha Hatsudoki Kabushiki Kaisha (JP)

( * ) Notice: Subject to any disclaimer, the term of this patent is extended or adjusted under 35 U.S.C. 154(b) by 533 days.

(21) Appl. No.: 11/484,172

(22) Filed: Jul. 10, 2006

(65) Prior Publication Data

US 2007/0007064 A1    Jan. 11, 2007

(30) Foreign Application Priority Data

Jul. 11, 2005    (JP)    ............................. 2005-201476

(51) Int. Cl.
   *B62M 1/10*    (2006.01)
   *B62M 23/02*   (2006.01)
   *B62D 61/02*   (2006.01)

(52) U.S. Cl. ...................... 180/205; 180/65.1; 180/206; 180/220; 280/212

(58) Field of Classification Search ....... 180/65.1–65.5, 180/205–207, 219, 220; 280/210, 212; 297/188.08, 297/188.09, 188.1, 195.13, 243
   See application file for complete search history.

(56) References Cited

U.S. PATENT DOCUMENTS

| | | | |
|---|---|---|---|
| 3,779,597 A | | 12/1973 | Uchida |
| 4,802,682 A | | 2/1989 | Yasuji |
| 5,222,572 A | * | 6/1993 | Yamagiwa et al. .......... 180/220 |
| 5,433,286 A | * | 7/1995 | Kumamaru et al. ......... 180/219 |
| 5,489,002 A | | 2/1996 | Streiff et al. |
| 5,647,450 A | * | 7/1997 | Ogawa et al. ............... 180/220 |
| 5,789,898 A | * | 8/1998 | Suzuki et al. ............... 320/104 |
| 5,853,062 A | * | 12/1998 | Hulett ........................ 180/206 |
| 6,276,479 B1 | * | 8/2001 | Suzuki et al. ............... 180/207 |
| 6,588,787 B2 | * | 7/2003 | Ou ............................. 280/287 |
| 6,623,071 B2 | * | 9/2003 | Kawamoto et al. ..... 297/195.13 |
| 6,739,421 B1 | | 5/2004 | Miya |
| 7,017,694 B2 | * | 3/2006 | Shirazawa ................. 180/65.5 |
| 7,117,966 B2 | * | 10/2006 | Kohda et al. ............... 180/68.5 |
| 7,369,035 B2 | * | 5/2008 | Konno et al. ............... 340/5.73 |
| 2004/0031632 A1 | * | 2/2004 | Kohda et al. ............... 180/68.5 |

(Continued)

FOREIGN PATENT DOCUMENTS

DE    22 18 730 A1    11/1973

(Continued)

OTHER PUBLICATIONS

EP Search Report for Application No. EP/06014246, mailed Sep. 29, 2006.

*Primary Examiner*—Lesley D Morris
*Assistant Examiner*—Marc A Scharich
(74) *Attorney, Agent, or Firm*—Knobbe Martens Olson & Bear LLP

(57) ABSTRACT

An electric bicycle includes at least two internal storage compartments accessible by moving a seat to an open position. The storage compartments are arrange side-by-side and separated by a dead space (e.g., a wall). The electric bicycle includes a lock mechanism disposed in the dead space for selectively locking the seat in a closed position. As so arranged, the lock mechanism does not reduce the size of the two internal storage compartments and is less likely to be tampered with in comparison to lock mechanisms that are located around the perimeter of the storage compartments.

11 Claims, 14 Drawing Sheets

U.S. PATENT DOCUMENTS

| | | | |
|---|---|---|---|
| 2004/0069549 A1* | 4/2004 | Ono et al. | 180/65.8 |
| 2006/0000655 A1* | 1/2006 | Schless | 180/220 |
| 2007/0007063 A1* | 1/2007 | Okamoto et al. | 180/205 |
| 2007/0023216 A1* | 2/2007 | Isayama | 180/219 |

FOREIGN PATENT DOCUMENTS

| | | |
|---|---|---|
| DE | 197 32 468 A1 | 6/1998 |
| DE | 200 14 260 U1 | 1/2001 |
| EP | 0 741 441 A2 | 4/1996 |
| EP | 1 389 552 A1 | 8/2003 |
| JP | 2002-326596 | 11/2002 |

* cited by examiner

ELECTRIC BICYCLE

RELATED APPLICATIONS

The present application is based on and claims priority under 35 U.S.C. § 119(a)-(d) to Japanese Patent Application No. 2005-201476, filed on Jul. 11, 2005, the entire contents of which are hereby expressly incorporated by reference herein.

BACKGROUND OF THE INVENTION

1. Field of the Invention

The present invention relates to an electric bicycle having a pedal portion and electric motor that both generate a driving force.

2. Description of the Related Art

Known electric bicycles have an electric motor for generating a driving force and a pedal portion for a rider to input additional driving force. The bicycle may store a helmet and battery in storage compartments located below the seat of the bicycle. The seat may be movable relative to the body so as to permit access to the helmet and battery.

The seat is securely fixed to the bicycle except when the rider accesses the storage compartments. To open and close the storage compartments, one end of the seat is hinged to the body of the bicycle. A lock is used at the other end of the seat to secure the seat in the closed position. Exemplary lock mechanisms include a clamp-type fastening member mounted outside the storage compartments and exposed to the outside environment. Alternatively, the locking mechanism may be protected from the environment and located within one of the storage compartments. A key may be used to unlock the seat from the body of the bicycle.

However, external locking mechanisms may be tampered with while internal locking mechanisms reduce the size of the storage compartments.

SUMMARY OF THE INVENTION

In view of the foregoing, a need exists for an electric bicycle having a more reliable locking mechanism without appreciably reducing the size of the storage compartments.

An aspect of the invention is directed to an electric bicycle that comprises a body having a longitudinal axis, a pedal portion, an electric motor, a battery for driving the electric motor, and a battery storage compartment disposed within the body and along the longitudinal axis. The electric bicycle further comprises an article storage compartment disposed within the body and along the longitudinal axis with the battery storage compartment and the article storage compartment being separated by a member. A seat is hinged to the body so as to move between an open position and closed position, the battery storage compartment and the article storage compartment are accessible when the seat is in the open position and inaccessible when the seat is in the closed position. A lock system disposed on the member and the seat so as to selectively lock the seat to the body.

Another aspect of the invention is directed to a bicycle having a longitudinal axis. The bicycle has a first storage compartment disposed within the bicycle and a second storage compartment disposed within the bicycle. The first and second storage compartments are arranged along the longitudinal axis and are separated by a member. The bicycle further includes a seat that moves between an open position and a closed position. The first and second storage compartments are accessible when the seat is in the open position and inaccessible when the seat is in the closed position. A lock is disposed on the member so as to selectively lock the seat in the closed position.

The systems and methods of the invention have several features, no single one of which is solely responsible for its desirable attributes. Without limiting the scope of the invention as expressed by the claims, its more prominent features have been discussed briefly above. After considering this discussion, and particularly after reading the section entitled "Detailed Description of the Preferred Embodiments," one will understand how the features of the system and methods provide several advantages over conventional electric bicycles.

BRIEF DESCRIPTION OF THE DRAWINGS

These and other features, aspects and advantages of the present invention will now be described in connection with preferred embodiments of the invention, in reference to the accompanying drawings. The illustrated embodiments, however, are merely examples and are not intended to limit the invention. The following are brief descriptions of the drawings.

DETAILED DESCRIPTION OF THE PREFERRED EMBODIMENTS

The following detailed description is now directed to certain specific embodiments of the invention. In this description, reference is made to the drawings wherein like parts are designated with like numerals throughout the description and the drawings.

Figure 1:
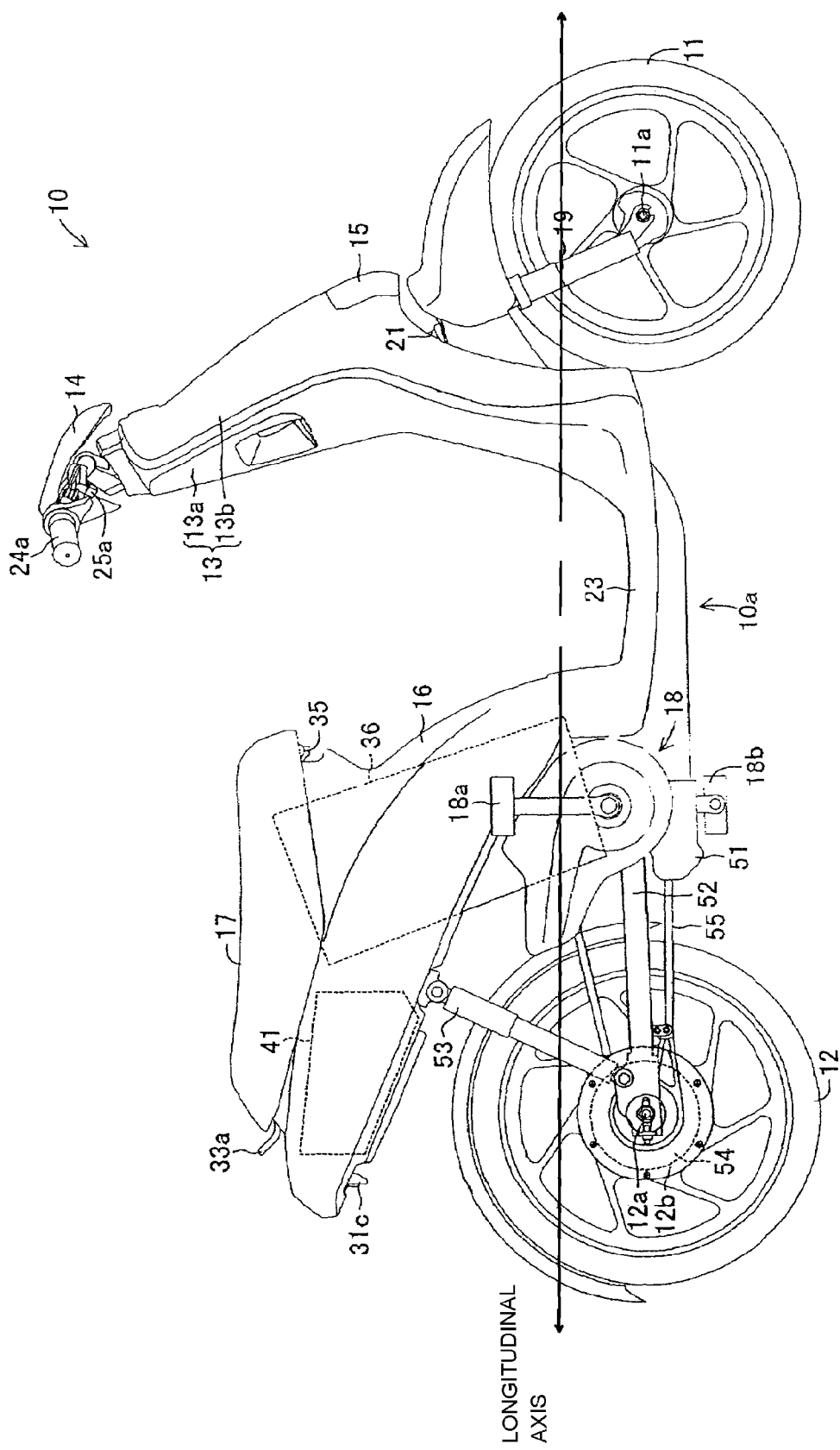
FIG. 1 is a side view showing an electric bicycle configured in accordance with a preferred embodiment of the present invention.
Figure 2:
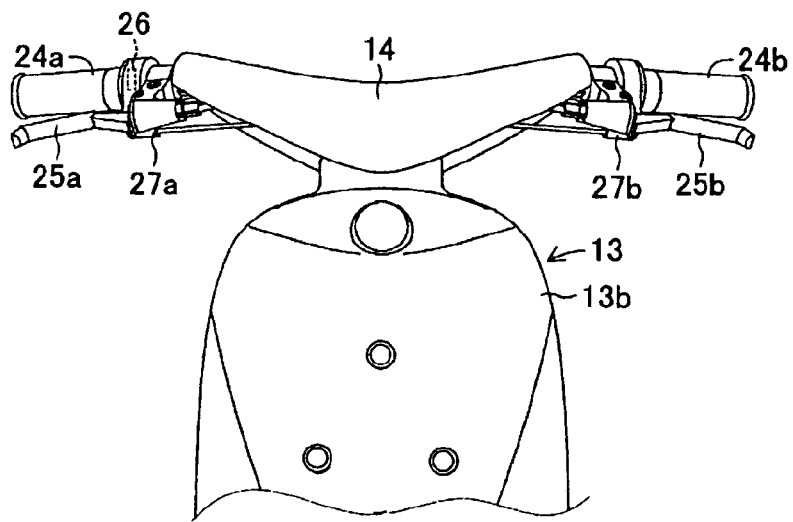
FIG. 2 is a partial front plan view of an upper portion of the electric bicycle of FIG. 1 showing a handlebar assembly thereof.

FIG. 1 is a side view showing an electric bicycle 10 configured in accordance with a preferred embodiment of the present invention. FIG. 2 is a front view of an upper portion of the electric bicycle 10 of FIG. 1. The electric bicycle 10 may include a body 10a and wheels mounted to the body 10a. The wheels may include a front wheel 11 and a rear wheel 12.

The body 10a may include a handlebar 14, a front cover member 13, a connection cover member 23, and a rear cover member 16. As illustrated in FIG. 1, a light 15 is located near the center of the front cover member 13. The rear cover member 16 has a seat 17 formed on an upper surface. A lower portion of the body 10a includes a pedal portion 18. A rider may input driving force to the pedal portion 18.

Figure 3:
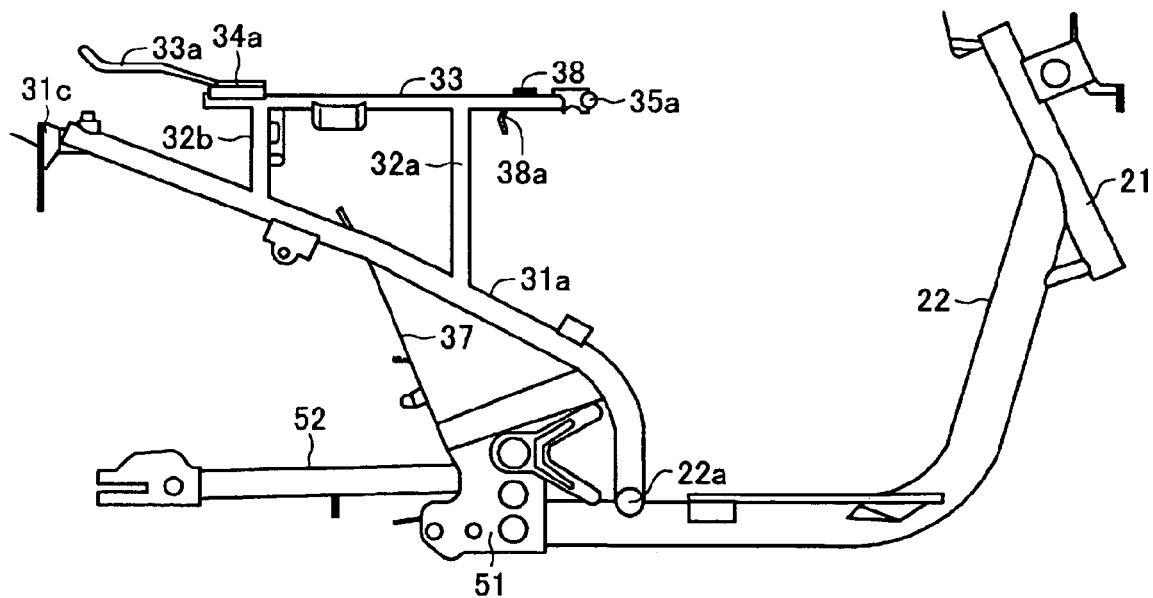
FIG. 3 is a side view of a frame portion of the electric bicycle of FIG. 1.

The body 10a may further include a front fork 19 which supports the front wheel 11 and a head pipe 21. A center shaft 11a of the front wheel 11 is rotatably attached to the lower end portions of the front fork 19 to allow the front wheel 11 to rotate about the center shaft 11a. As most clearly shown in FIG. 3, the head pipe 21 connects to a down tube 22 of the body 10a. As illustrated in FIGS. 1 and 3, the down tube 22 is located inside the connection cover member 23.

A steering shaft (not shown) connects to the front fork 19 and is mounted inside the head pipe 21. An upper portion of the steering shaft extends from an upper end portion of the head pipe 21 to connect with the handlebar 14. Turning the handlebar 14 axially rotates the steering shaft so as to change the direction of the front wheel 11.

As most clearly shown in FIG. 2, left and right grips 24a, 24b are disposed at the ends of the handlebar 14. The grip 24a is axially rotatable and controls the rotational speed of an electric motor 54. A potentiometer 26 detects the amount of rotation of the grip 24a. Brake levers 25a, 25b are disposed near the grips 24a and 24b, respectively. The brake levers 25a and 25b are spaced from the grips 24a, 24b, and when pulled towards the grips 24a, 24b serve to suppress the rotation of the front wheel 11 or rear wheel 12, respectively. Brake switches 27a and 27b connected to the brake levers 25a and 25b detect when the brake levers 25a and 25b are pulled towards the grips 24a, 24b.

As most clearly shown in FIG. 1, the front cover member 13 may have a rear surface cover portion 13a forming the rear surface and a front surface cover portion 13b forming the front surface. The rear surface cover portion 13a and the front surface cover portion 13b may be fixed in place with a plurality of screws with a space being formed inside the inner portion of the front cover member 13. The space may house the head pipe 21, the down tube 22, the steering shaft, a controller for electrically controlling a drive system, and a power supply switch (not shown).

Figure 4:
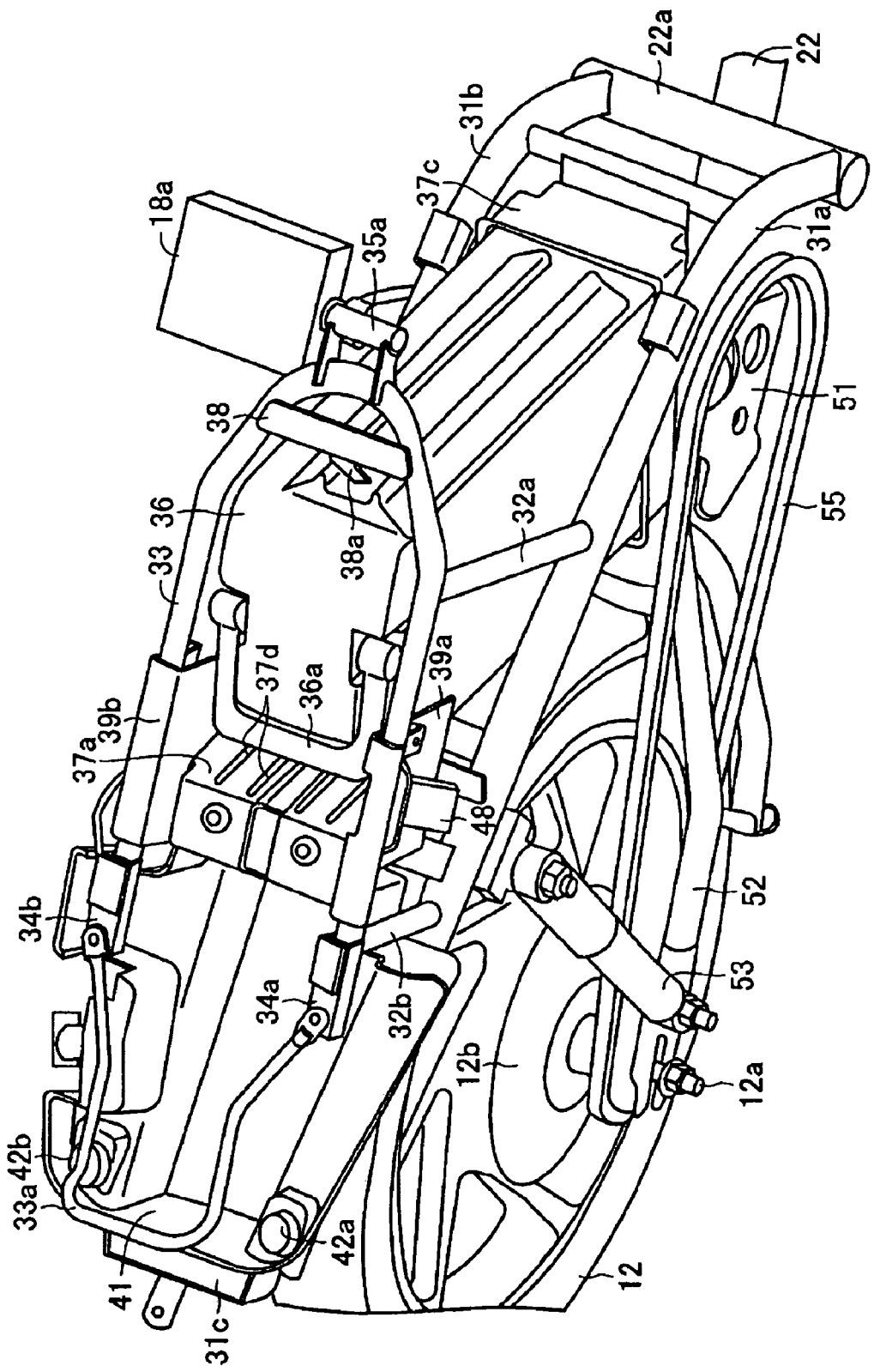
FIG. 4 is a perspective view of a rear portion of the electric bicycle of FIG. 1 with a seat and rear cover member removed to show a battery located within a battery storage compartment.

As most clearly shown in FIGS. 3 and 4, The down tube 22 extends in a rearward and diagonally downward direction from the head pipe 21 and then curves so as to extend horizontally in a rearward direction. A pair of rear frames 31a and 31b extends diagonally upward within the rear cover member 16. The rear frames 31a, 31b connect to the rear side of the down tube 22 via a horizontal support bar 22a. A plate-like connecting member 31c connects the rear end portions of the rear frames 31a and 31b together.

Pipe-like suspension members 32a, 32b having different lengths are connected to the respective upper surfaces of the rear frames 31a and 31b while maintaining a predetermined spacing therebetween. The heights of the upper end portions of the suspension members 32a and 32b are set to be substantially the same. A seat rail 33 is connected to the upper end portions. The seat rail 33 may have a U-shape as shown in FIG. 4 and connects to the upper end portion of each of the suspension members 32a and 32b so that the curved portion of the U-shaped seat rail 33 is located on the front side of the electric bicycle 10.

An auxiliary seat rail 33a connects via connecting members 34a, 34b to both rear end portions of the seat rail 33. The seat rail 33 and the auxiliary seat rail 33a define a frame portion. In the illustrated embodiment, the frame portion has a longitudinally elongated, substantially elliptical shape.

As most clearly shown in FIG. 3, the electric bicycle 10 further includes a rear arm 52 connected to a rear portion of the down tube 22 via a connecting member 51. The rear arm 52 includes a pair of parallel arm members connected at their front end portions. As most clearly shown in FIG. 1, the arm members of the rear arm 52 support a center shaft 12a about which the rear wheel 12 rotates. A rear cushion or shock absorber 53 connects between an upper portion of each arm member and a corresponding rear frame 31a, 31b. The rear arm 52 can swing up and down due to the expansion and contraction of the rear cushion 53.

The electric bicycle 10 further includes a transmission case 12b located at a central region of the rear wheel 12. The transmission case 12b may house an electric motor 54 and a reduction gear. The electric motor 54 generates driving force in the rear wheel 12. A drum brake (not shown) may be mounted to the left side of the transmission case 12b. The front wheel 11 also has a brake (not shown). The front and rear brakes are activated by operation of their respective brake levers 25a, 25b. A rotary stand (not shown) may keep the electric bicycle 10 upright when the bicycle is stationary.

A controller controls the electric motor 54 based on how much the rider rotates the grip 24a. When the brake levers 25a and 25b are operated, the controller stops the electric motor 54.

The electric bicycle 10 further includes a chain 55 suspended between gears of the pedal portion 18 and the rear wheel 12. As the rider's feet rotate pedals 18a, 18b, a human generated driving force is transmitted from the pedal portion 18 to the rear wheel 12 via the chain 55.

The body 10a may further include a guide member 37 for supporting a battery 36 mounted within the body 10a. The guide member 37 may be L-shaped. The guide member 37 may be mounted between the rear frames 31a, 31b and angled so that a bottom portion of the guide member 37 is located near the front side of the rear frames 31a, 31b.

Figure 5:
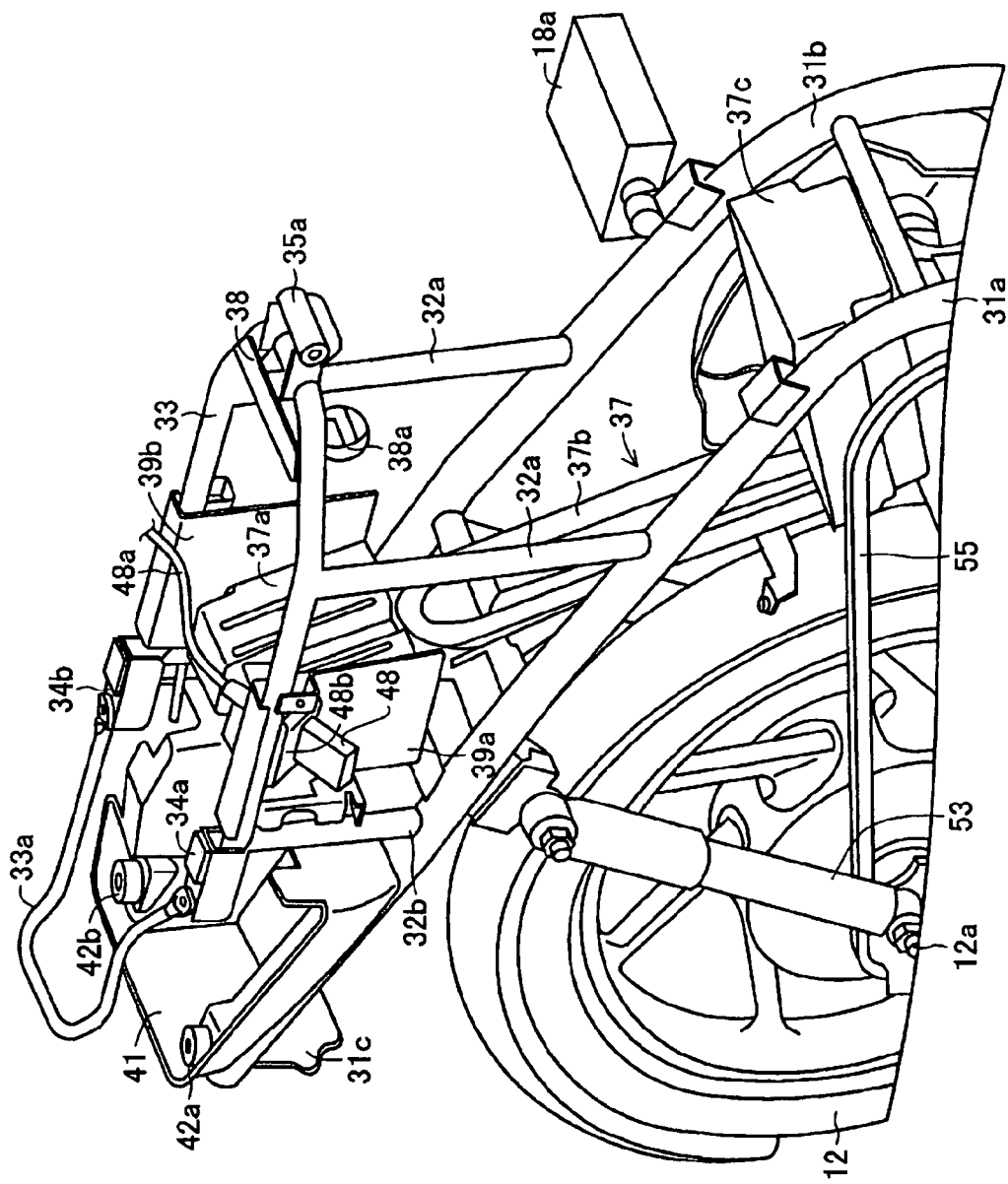
FIG. 5 is a perspective view of the electric bicycle shown in FIG. 4 with the battery removed.

FIG. 5 is a perspective view of the electric bicycle 10 shown in FIG. 4 with the battery 36 removed. The guide member 37 may have a wall surface portion 37a, a rail portion 37b, and a bottom surface portion 37c. A front surface of the wall surface portion 37a is inclined relative to horizontal so that the lower portion of the wall surface portion 37a is located forward of the top portion of the wall surface portion 37a. A plurality of vertically extending protrusions 37d may be formed in the wall surface portion 37a. The rail portion 37b may include a resin-formed member that extends downwardly from the lower portion of the wall surface portion 37a and parallel to the wall surface portion 37a. The bottom surface portion 37c may have a box shape.

A T-shaped support member 38 is bridged over the front end-side portion of the seat rail 33. A regulating member 38a is mounted to the lower end portion of the support member 38. The regulating member 38a contacts an upper portion of the front surface of the battery 36 and inhibits longitudinal rocking of the battery 36 together with the wall surface portion 37a.

Support plates 39a, 39b are mounted to the seat rail 33 and extend in a downward direction on either side of the battery storage compartment. The guide member 37, the rear frames 31a and 31b, the regulating member 38a, and the support plates 39a and 39b form the battery storage compartment.

Figure 6:
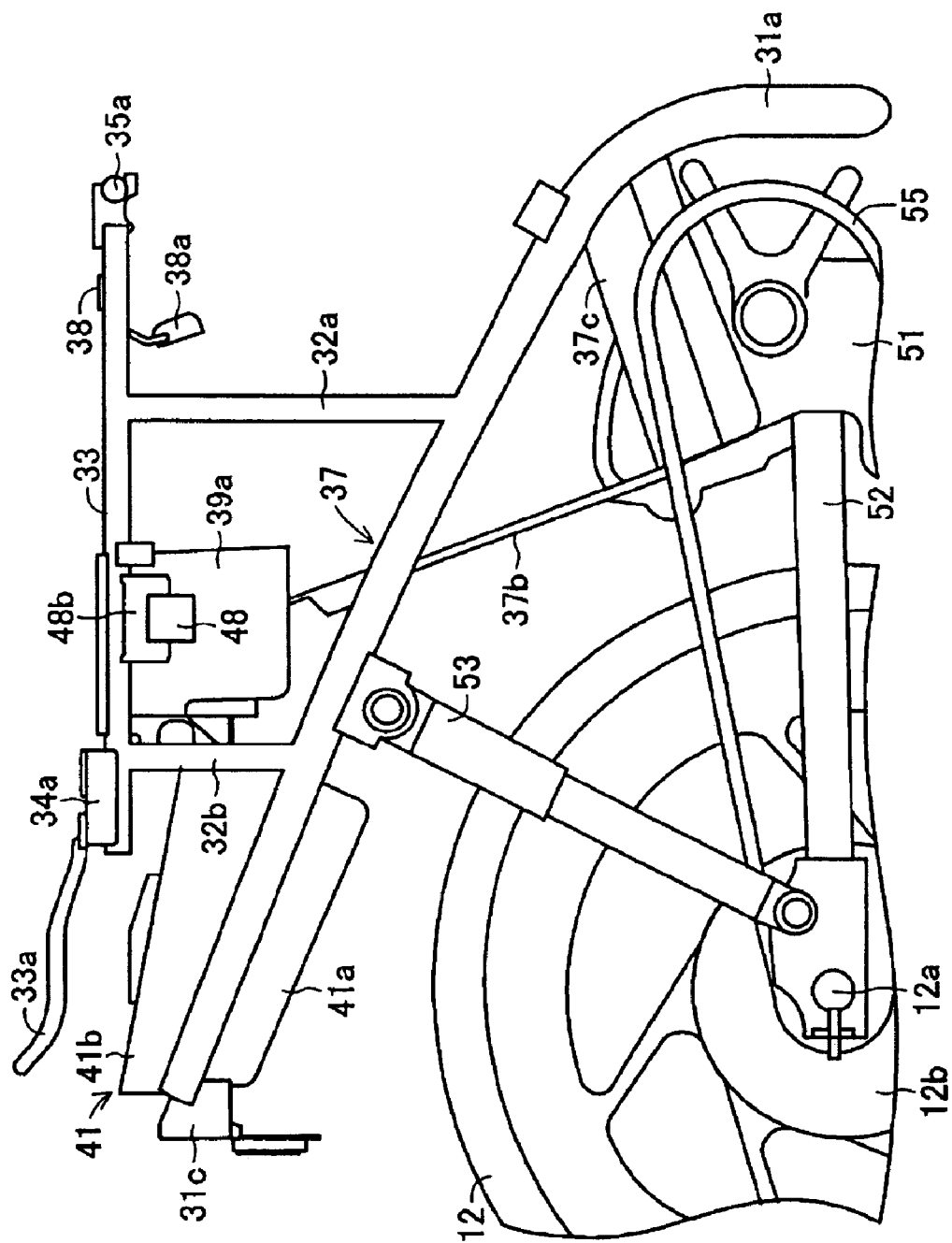
FIG. 6 is a side view of the portion of electric bicycle shown in FIG. 5.
Figure 7:
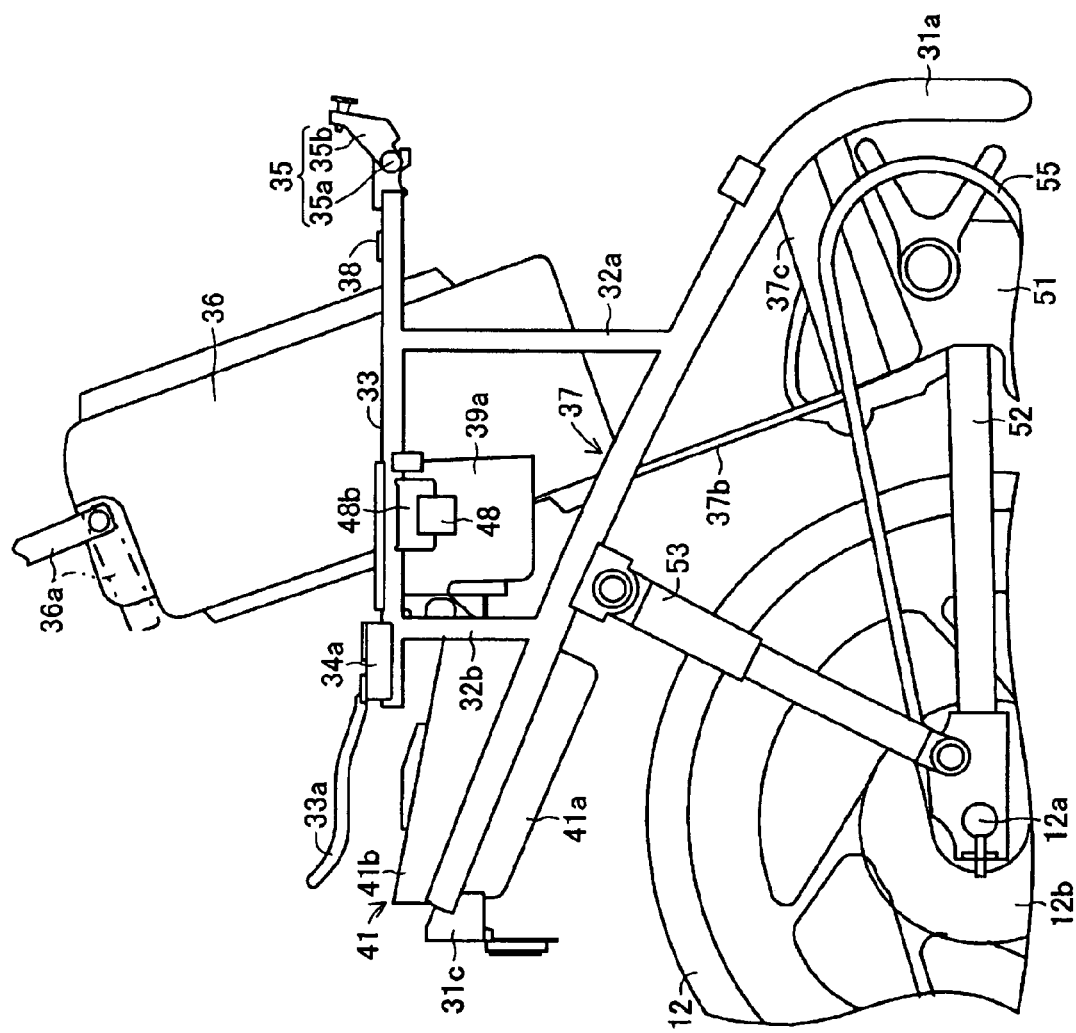
FIG. 7 is a side view of the electric bicycle shown in FIG. 6 with the battery in the process of being inserted into the frame portion.
Figure 8:
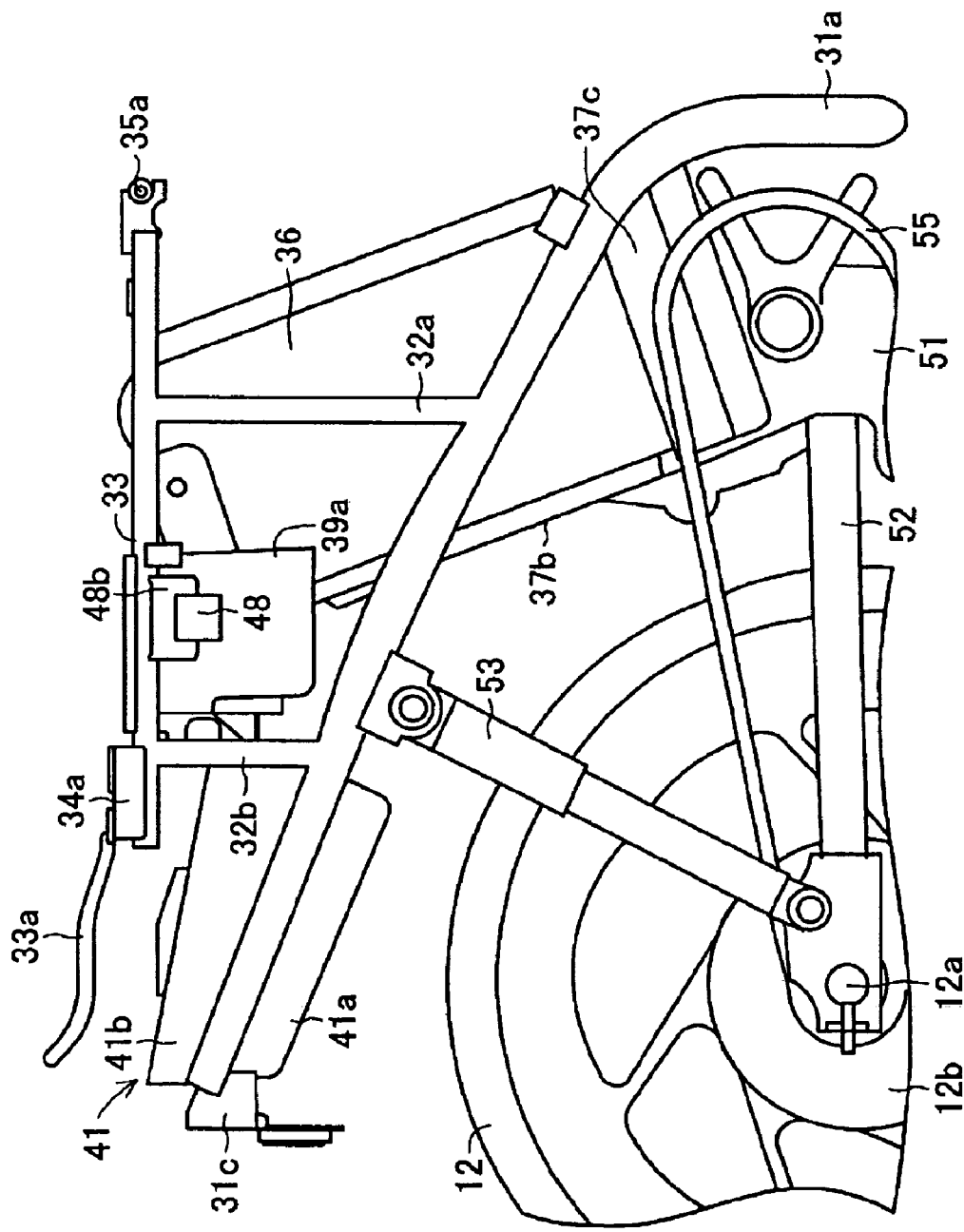
FIG. 8 is a side view of the electric bicycle shown in FIG. 7 with the battery inserted into the frame portion.

FIG. 6 is a side view of the electric bicycle 10 shown in FIG. 4 with the battery 36 removed. FIG. 7 is a side view of the electric bicycle 10 shown in FIG. 6 with the battery 36 in the process of being mounted to the frame portion. The battery 36 is installed in the battery storage compartment by sliding the battery 36 diagonally downward along the guide member 37. FIG. 8 is a side view of the electric bicycle shown in FIG. 7 with the battery mounted to the frame portion.

FIG. 4 is a perspective view of the electric bicycle 10 of FIG. 1 with a seat 17 and rear cover member removed to show a battery 36 located within a battery storage compartment. The battery 36 preferably has a handle 36a on an upper surface. The handle 36a may be rotated between a low profile position where the handle 36a is folded against the upper rear edge of the battery 36 and a position where the handle 36a is spaced from the battery 36 so as to be grasped. When spaced from the battery 36, the rider grasps the handle 36a to move the battery 36. When the battery 36 is installed within the battery storage compartment, the lower portion of the battery 36 is inserted into the bottom surface portion 37c, thereby inhibiting longitudinal and lateral movements of the battery 36. The wall surface portion 37a and the regulating member 38a inhibit longitudinal movement of the upper portion of the battery 36. The support plates 39a, 39b inhibit lateral movement of the battery 36.

The electric bicycle 10 further comprises a storage container 41 fixed to the rear end portions of the rear frames 31a, 31b via fixing members 42a, 42b, respectively. The storage container 41 defines an article storage compartment for, for example, a helmet. To maximize the volume of the article storage compartment, the sides of the storage container 41 may closely follow the contours of the rear frames 31a, 31b. For example, a lower portion 41a of the storage container 41 which is located below the upper surface of the rear frames 31a, 31b, may be narrower than an upper portion 41b of the storage container 41. That is, the lower portion 41a may have a box shape and extend down between the rear frames 31a, 31b. The upper portion 41b of the storage container 41 located above the upper surface of the rear frames 31a, 31b may have a greater width than the lower portion 41a. Thus, the lower portion 41a is smaller in width than the upper portion 41b.

The upper portion 41b sits on the top surfaces of the rear frames 31a, 31b and extends in an upward direction. Accordingly, the upper portion 41b is larger in width than the portion between the rear frames 31a and 31b. The lengths of the upper and lower portions of the storage container 41 illustrated in FIG. 5 are approximately the same. The illustrated embodiment increases the volume of the storage container 41 as a whole while the rear frames 31a, 31b protect the lower portion 41a of the storage container 41.

Of course the invention is not so limited. The storage container 41 could have any number of different dimensions measured in the lateral, longitudinal, or transverse directions depending on the dimensions of the electric bicycle 10 and the desired size of the storage container 41. Moreover, the storage container could have three or more portions, each having a different shape or dimension than another portion.

The wall surface portion 37a separates the storage container 41 from the battery storage compartment. Preferably, the perimeters of the battery storage compartment and article storage compartment, the rear frames 31a and 31b, and the seat rail 33 are covered by the rear cover member 16. The openings into the storage and battery compartments are accessible when the seat 17 is in the open position.

Figure 9:
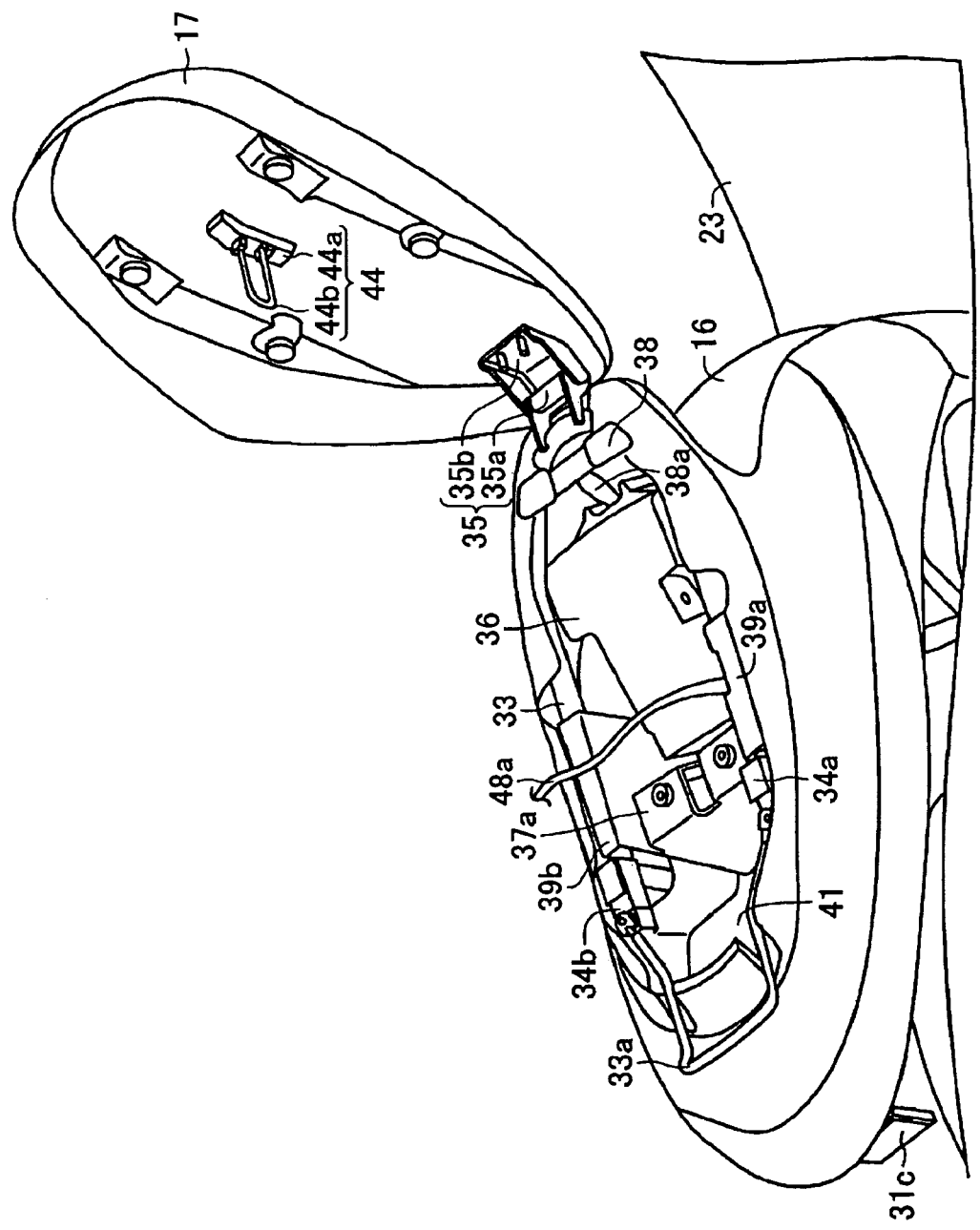
FIG. 9 is a perspective view of the rear portion of the electric bicycle of FIG. 1 with the seat lifted up to expose the battery and an article storage compartment.
Figure 10:
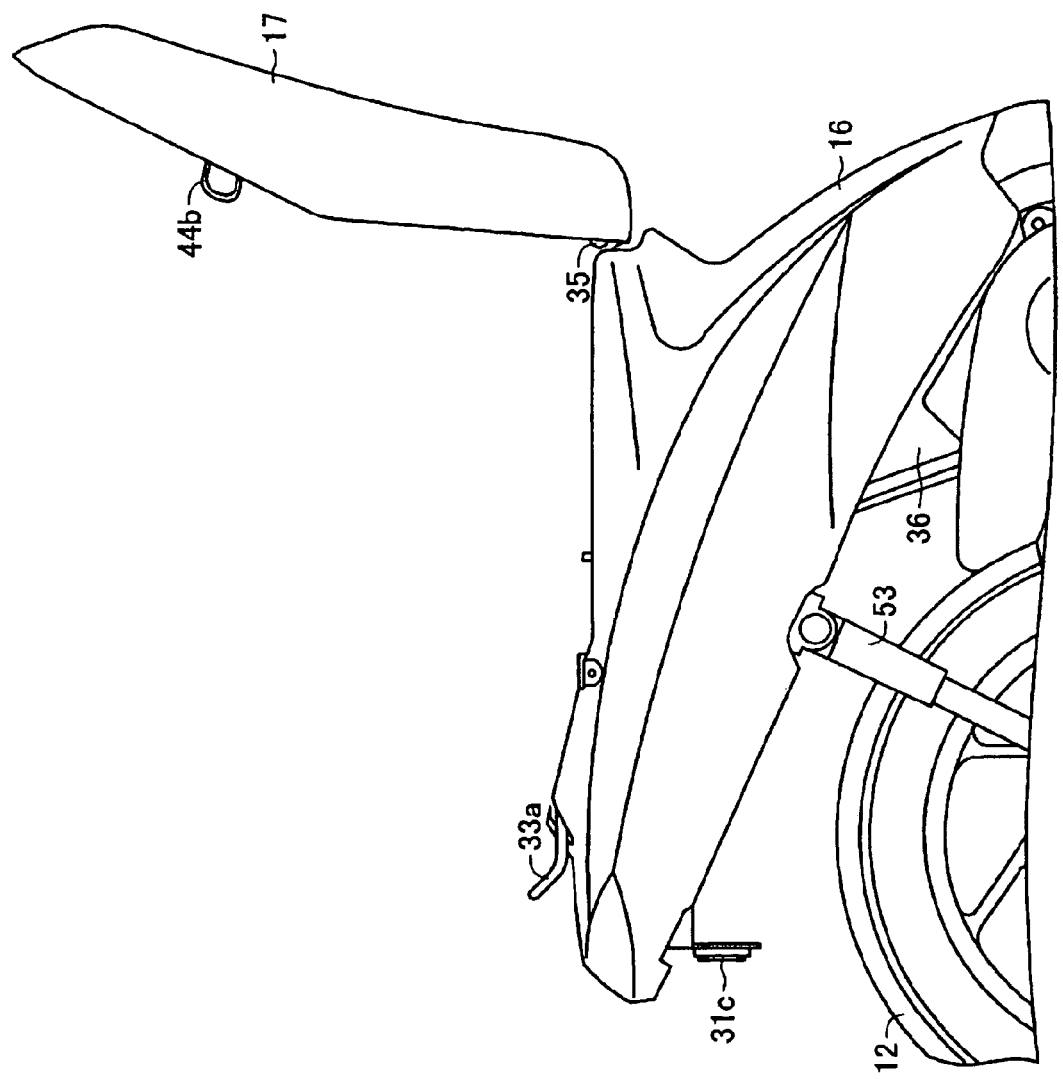
FIG. 10 is a side view of the rear portion of the electric bicycle of FIG. 9 with the seat lifted.
Figure 11:
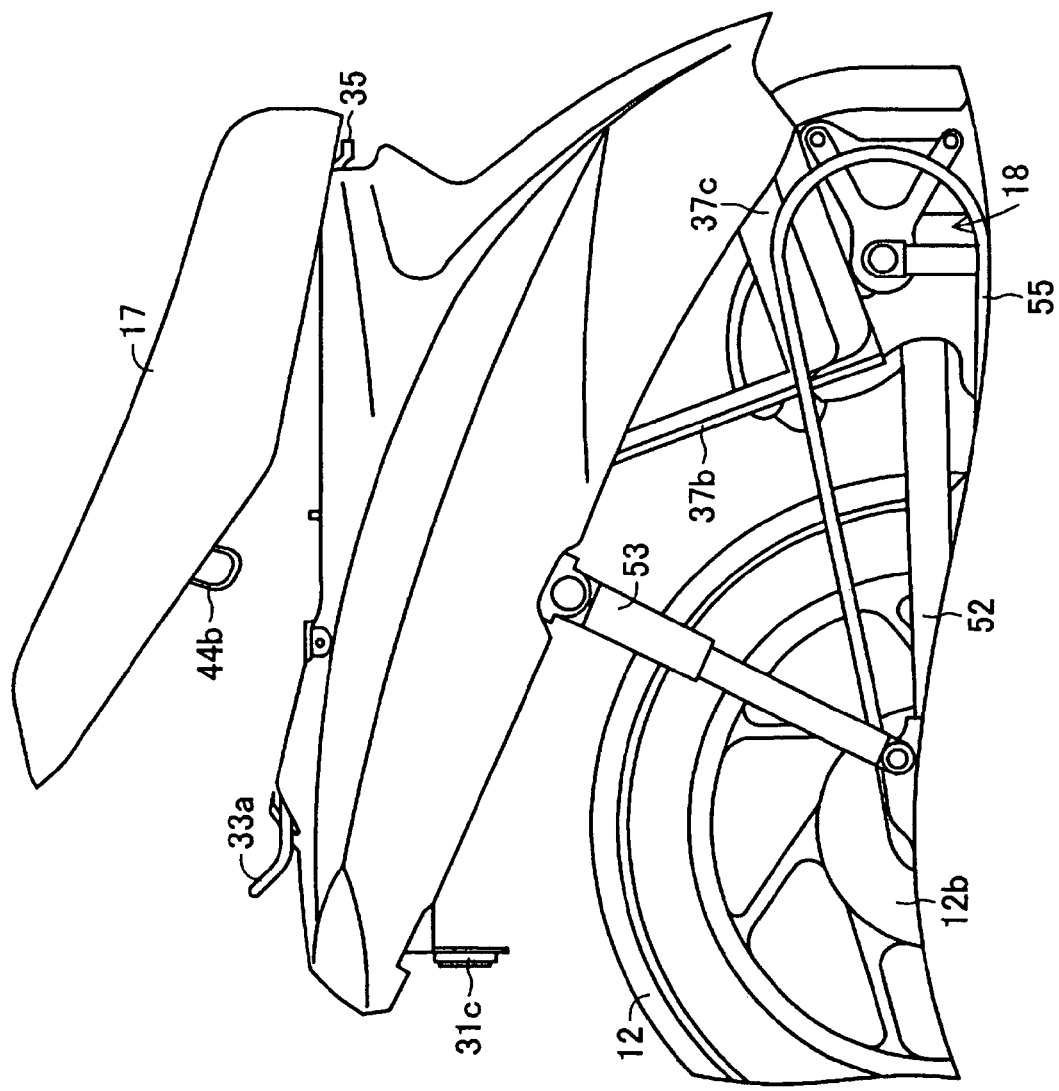
FIG. 11 is a side view of the rear portion of the electric bicycle of FIG. 10 with the seat in a partially lowered position.

FIG. 9 is a perspective view of the electric bicycle 10 of FIG. 1 with the seat 17 lifted up to expose the battery 36 and the rear storage container 41. FIG. 10 is a side view of the electric bicycle 10 of FIG. 9 with the seat 17 lifted up. A connecting member or hinge 35 allows the seat 17 to rotate or pivot relative to the seat rail 33. A mounting member 35b is fixed to the seat 17 and rotatably coupled to the seat rail 33 via rotary shaft member 35a. The seat 17 rotates about the rotary shaft member 35a as shown in FIGS. 10 and 11.

Figure 12:
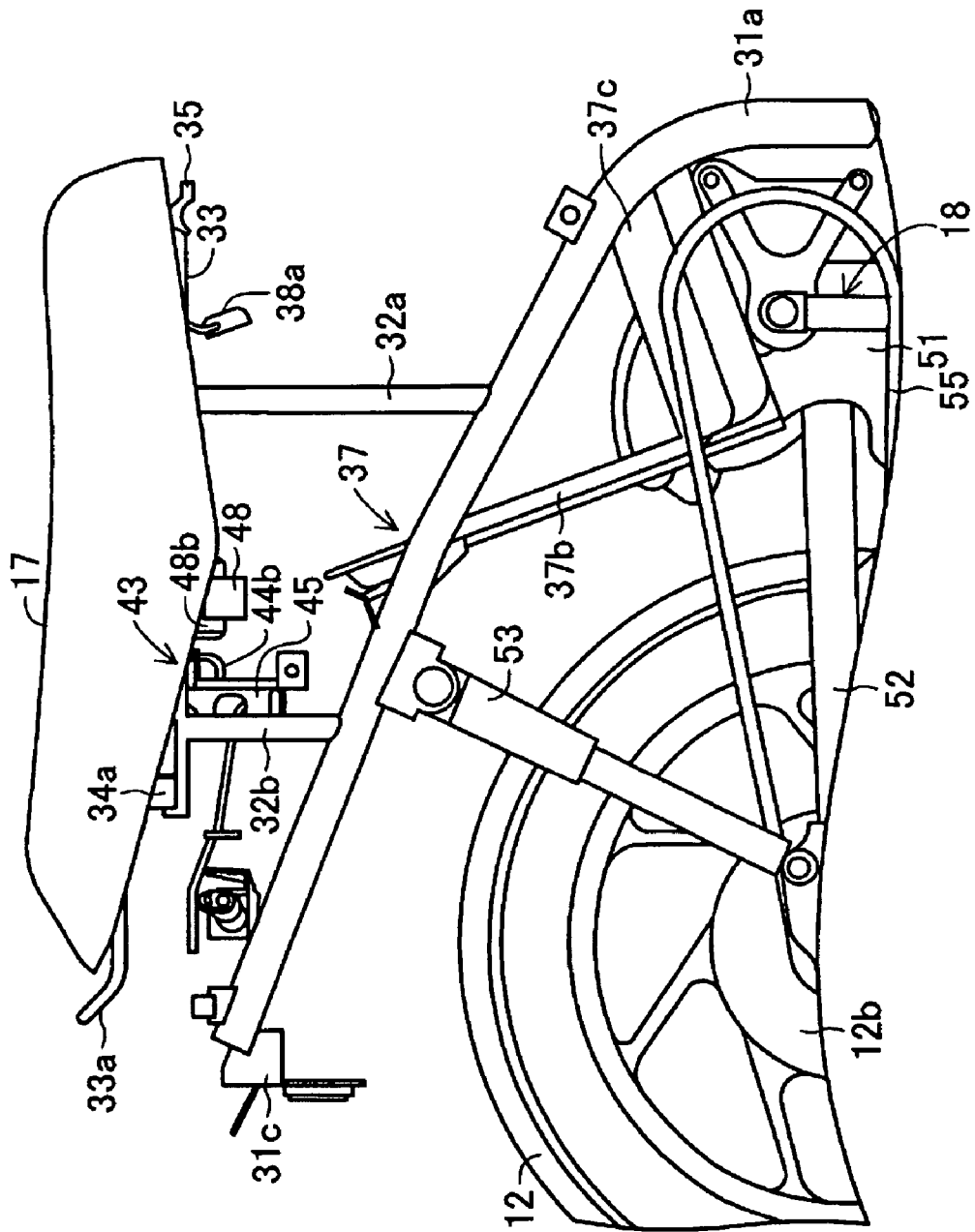
FIG. 12 is a side view of the rear portion of the electric bicycle shown in FIG. 6 with the seat locked to the body.
Figure 13:
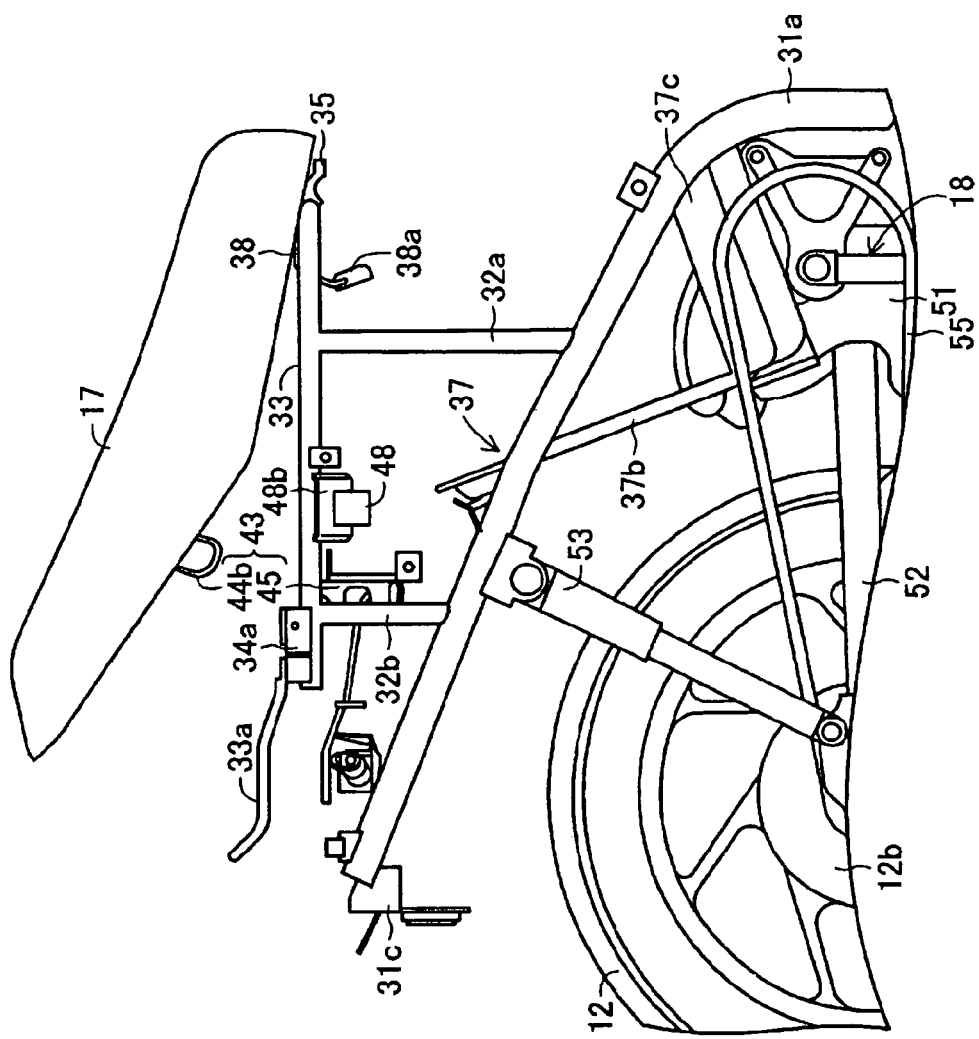
FIG. 13 is a side view of the rear portion of the electric bicycle shown in FIG. 12 with the seat unlocked from the body.

FIG. 12 is a side view of the electric bicycle 10 shown in FIG. 6 with the seat 17 locked to the body. FIG. 13 is a side view of the electric bicycle 10 shown in FIG. 12 with the seat 17 unlocked from the body. A charging connector 48 is mounted to a bracket 48b. As most clearly shown in FIG. 5, the bracket 48b is attached to the seat rail 33 and the support plate 39a. The connector 48 is disposed so that an end of the connector 48 may be connected to the battery 36 in the battery storage compartment. Through an opening in the support plate 39a, another end of the connector 48 may be connected to a charging terminal (not shown) to charge the battery 36.

When the seat 17 is lifted up to open the battery storage compartment, the charging terminal of the connector 48 is exposed. When the seat 17 is lowered to close the battery storage compartment, the charging terminal is hidden under the seat 17. Accordingly, the connector 48 may be disposed in a compact manner within the rear cover member 16 and the seat 17. Since the connector 48 is hidden by the seat 17 when the seat 17 is lowered, the charging apparatus is protected against tampering or the like. The battery 36 may be charged with the seat 17 in the closed position with the connector 48 connected to the power source by the connection cord 48a.

Figure 14:
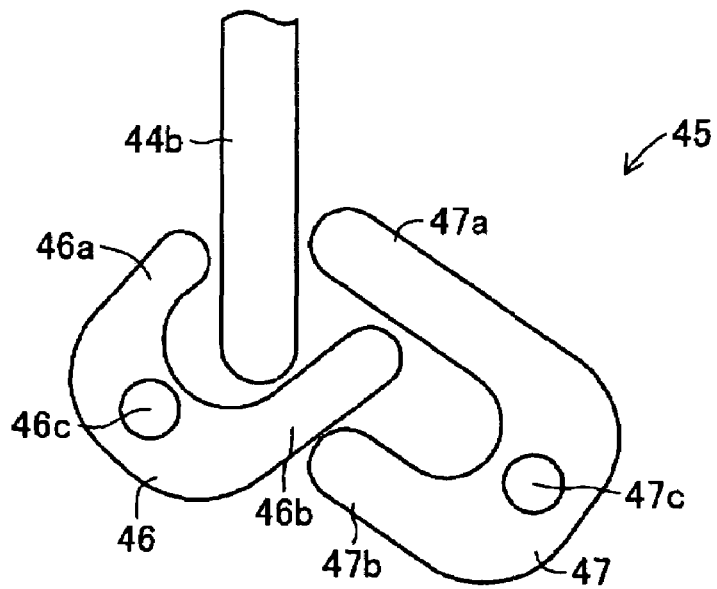
FIG. 14 is a side view of a lock mechanism of the electrical bicycle shown in FIG. 13, shown in an unlocked state.
Figure 15:
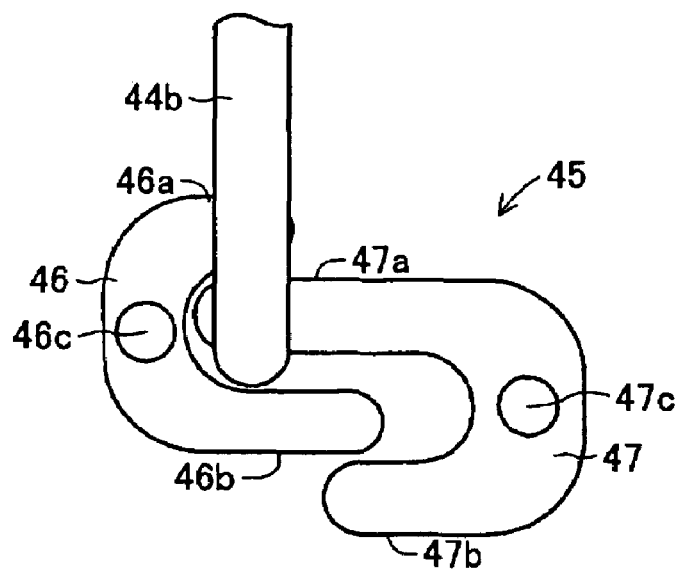
FIG. 15 is a side view of the lock mechanism of FIG. 14 in a locked state.

FIG. 14 is a side view of a lock mechanism 43 used to latch and lock the seat to the frame when closed. FIG. 15 is a side view of the lock mechanism 43 from FIG. 14 in a locked state. The lock mechanism 43 includes an engaged portion or latch 44 (see FIG. 9) and an engaging portion or keeper 45. The engaging portion 45 detachably engages with the engaged portion 44. The engaged portion 44 is fixed to a lower surface of the seat 17 at a location above the upper central portion of the wall surface portion 37a when the seat 17 is in the closed position. The engaged portion 44 includes a fixing member 44a fixed onto the lower surface of the seat 17 and an engaged member 44b. The engaged member 44b may have a U-shape. The engaged portion 44b is attached to the fixing member 44a with its bent portion facing downward.

The engaging portion 45 is located in the wall surface portion 37a so as align with the engaged portion 44 when the seat 17 is in the closed position. In the illustrated embodiment, the engaging portion 45 is disposed along the longitudinal axis of the electric bicycle 10 and near the middle of the upper surface of the wall surface portion 37a. The positions of the engaging portion 45 and the engaged portion 44 may be reversed so that the engaging portion 45 is disposed on the lower surface of the seat 17 while the engaged portion 44 is disposed on the wall surface portion 37a.

The engaging portion 45 may include an engaging member 46 and a disengaging member 47. The engaging member 46 and disengaging member 47 are generally C-shaped and face each other.

The engaging member 46 may have a central portion and two projections 46a, 46b with the central portion being rotatably supported on a shaft portion 46c. The engaging member 46 is biased by a spring member (not shown) so that the projection 46a preferably points in a vertical direction. The engaging member 46 rotates when the projection 46b is pushed downward by the engaged member 44b as the seat 17 is lowered onto the rear cover member 16.

The disengaging member 47 may have a central portion and two projections 47a, 47b with the central portion being rotatably supported on a shaft portion 47c. The projection 46b of the engaging member 46 is located between the projections 47a and 47b of the disengaging member 47 so that when the engaging member 46 rotates the disengaging member 47 rotates in the direction opposite to the engaging member 46.

Once rotated to the locked position as illustrated in FIG. 15, a fixing mechanism (not shown) prevents the disengaging member 47 from rotating back to the unlocked position illustrated in FIG. 14. The rider may release the locked fixing mechanism by inserting a key through a side of the rear cover member 16. When released, the spring member rotates the engaging member 46 so that the projection 46a is oriented in the vertical direction and releases the engaged member 44b.

Figure 16:
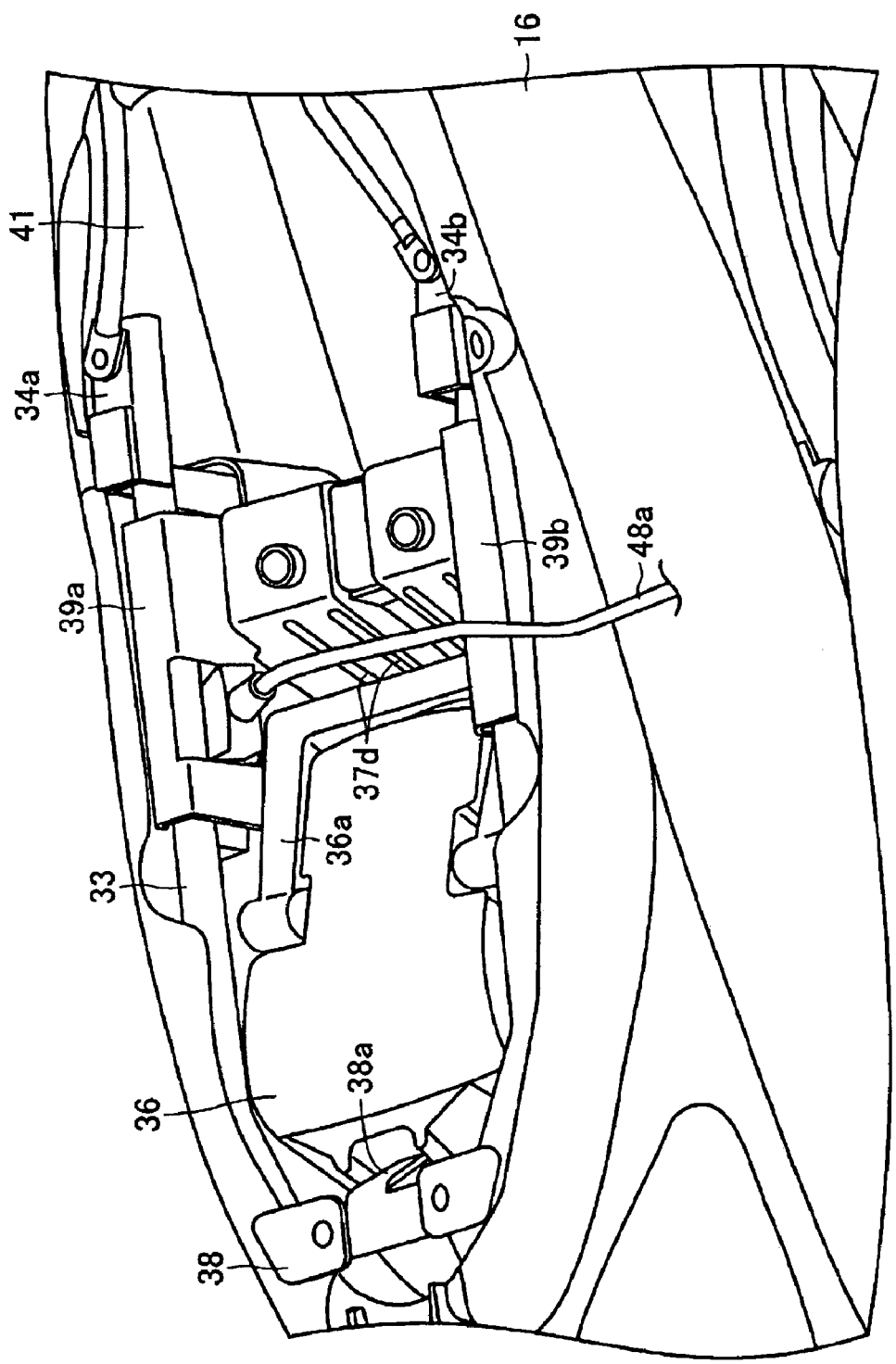
FIG. 16 is a perspective view of the electric bicycle of FIG. 1 with the seat lifted to attach a connection cord to a charging connector.

FIG. 16 is a perspective view of the electric bicycle 10 of FIG. 1 with the seat 17 lifted to allow a rider to attach a connection cord 48a to the charging connector 48. The rider may connect the connection cord 48a to an external power source (not shown) to charge the battery 36. The seat 17 may be closed during the charging process.

To operate the electric bicycle 10, the rider sits on the seat 17 and turns the power switch on. The rider may rest his/her feet on the pedals 18a, 18b. The rider controls the speed of the electric bicycle 10 by rotating the grip 24a clockwise and counter-clockwise. The electric motor 54 generates a driving force to the rear wheel 12 to propel the electric bicycle 10.

The rider may or may not add an additional driving force to the driving force generated by the electric motor 54. For example, the rider may rest his/her feet on the pedals 18a, 18b and not rotate the pedals 18a, 18b. In this state, a one-way clutch on the rear wheel 12 isolates the chain 55 and pedals 18a, 18b from the driving force being provided by the electric motor 54. In this way, the pedals 18a, 18b are not rotated by the electric motor 54. In another state, the rider may rotate the pedals 18a, 18b with his/her feet to add an additional driving force to the driving force being generated by the electric motor 54. In this state, the one-way clutch on the rear wheel 12 allows the chain 55 to engage with the rear wheel 12 to transmit the rider derived driving force to the rear wheel 12.

The electric bicycle 10 may also be operated as bicycle without the electric motor 54. For example, a rider may operate the electric bicycle 10 as a bicycle when running on a level or downhill road. In this state, the rider rotates the pedals 18a, 18b to generate the driving force in the rear wheel 12.

The brake levers 25a, 25b operate the front and rear brakes to lower the running speed of the electric bicycle 10. The rate at which the speed of the electric bicycle 10 drops is based on the degree which the brake levers 25a, 25b are pulled towards the grips 24a, 24b. For example, the initial movement of the brake levers 25a, 25b may stop the electric motor 54. Further movement of the brake levers 25a, 25b towards the grips 24a, 24b activates the front and rear brakes. When the electric bicycle 10 is stopped, the rider turns off the power switch and rotates the stand down to the ground so that the electric bicycle 10 stays upright on its own.

To recharge the battery 36, the rider connects the charging connection cord 48a to the connector 48. To access the connector 48, the rider unlocks the lock mechanism 43 using the key and rotates the unlocked seat 17 to the open position shown in FIGS. 9 and 10. The connector of the connection cord 48a is connected to the connector 48. During charging, the seat 17 may be lowered to cover the upper surface of the rear cover member 16. With the seat 17 closed, the connection cord 48a extends through a gap between the rear cover member 16 and the seat 17.

To remove the battery 36, the rider pulls the battery 36 in an upward and rearward direction along the inclined surface of the guide member 37. To install the battery 36, the rider lowers the battery 36 along the inclined surface of the guide member 37. When installed, the lower end of the battery 36 is positioned within the bottom surface portion 37c with the back surface of the battery 36 supported by the wall surface portion 37a. Rocking motion of the front of battery 36 is inhibited by the regulating member 38a.

In this way, the battery 36 may be smoothly removed from or installed into the electric bicycle 10. The battery 36 mounts within the electric bicycle 10 without rattling. The structural rigidity of the battery storage compartment is improved by locating the rear frames 31a, 31b and the seat rail 33 on both sides of the battery storage compartment. Various articles, such as a helmet, can be stored in the storage container 41 located rearward of the battery storage compartment.

The lock mechanism 43 is preferably located in the "dead space" between the battery storage compartment and the storage container 41 or article storage compartment. The lock mechanism 43 may located on a wall portion, a frame portion, or the like that separates the battery storage compartment from the article storage compartment. Portions of the lock mechanism 43 are attached in the region separating the compartments and to a portion of the lower surface of the seat 17. In this manner, the dead space between the compartments is effectively utilized by the lock mechanism 43. Accordingly, for example, there is no particular need to provide a space for the lock mechanism 43 that is located around the outer perimeter of the storage compartments. In the illustrated embodiment, the lock mechanism 43 is attached to an upper surface of the wall surface portion 37a and to the lower surface of the seat 17.

The lock mechanism 43 is arranged inside the body and the seat 17 and is not exposed to the outside. The lock mechanism 43 is protected against tampering or the like. Advantageously, the locking mechanism 43 does not reduce the space available for the battery storage compartment or the article storage compartment.

The guide member 37 guides the installation and removal of the battery 36 and also provides a surface for attaching the lock mechanism 43 so that the locking mechanism 43 is less likely to be tampered with and does not take up space in the battery or article compartments.

Advantageously, the seat rail 33 and the rear frames 31a, 31b surround the battery 36. The seat 17 is securely supported while the battery storage portion is securely protected by the rear frames 31a and 31b and the seat rail 33.

Although this invention has been disclosed in the context of a certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combine with or substituted for one another in order to form varying modes of the disclosed invention. Thus, it is intended that the scope of the present invention herein disclosed should not be limited by the particular disclosed embodiments described above, but should be determined only by a fair reading of the claims.

What is claimed is:

1. An electric bicycle comprising:
   a body having a longitudinal axis;
   a pedal portion;
   an electric motor;
   a battery for driving the electric motor;
   a battery storage compartment disposed within the body and along the longitudinal axis;
   an article storage compartment disposed within the body and along the longitudinal axis, the battery storage compartment and the article storage compartment being separated by a member;
   a seat hinged to the body so as to move between an open position and a closed position, the battery storage compartment and the article storage compartment being accessible when the seat is in the open position and inaccessible when the seat is in the closed position;
   a lock system disposed on the member and the seat so as to selectively lock the seat to the body;
   a steering shaft;
   a head pipe supporting the steering shaft;
   a down tube connected to the head pipe; and
   a pair of rear frames extending from the down tube, wherein the battery storage compartment and the article storage compartment are disposed between the pair of rear frames;
   wherein a bottom surface of the article storage compartment is disposed below an upper surface of each of the pair of rear frames, and both sides of an upper-side portion of the article storage compartment project outward beyond inner side surfaces of the pair of rear frames.

2. The electric bicycle according to claim 1, wherein a surface of the member guides the battery into the battery storage compartment.

3. The electric bicycle according to claim 1 further comprising a seat rail disposed above the pair of rear frames and around the battery storage compartment.

4. The electric bicycle according to claim 3 further comprising a connecting member for pivoting the seat between the open and closed positions, wherein the seat rail is bent in a semi-circular shape and connects to the connecting member.

5. The electric bicycle according to claim 1, further comprising a charging apparatus having a charging terminal, the charging apparatus being disposed within the body so that when the seat is in the open position the charging terminal is accessible, and when the seat is in the closed position the charging terminal is hidden by the seat.

6. A bicycle having a longitudinal axis comprising:
   a first storage compartment disposed within the bicycle;
   a second storage compartment disposed within the bicycle, the first and second storage compartments being arranged along the longitudinal axis and separated by a member;
   a seat that moves between an open position and a closed position, the first and second storage compartments being accessible when the seat is in the open position and inaccessible when the seat is in the closed position;
   a lock disposed on the member so as to selectively lock the seat in the closed position;
   a pair of rear frames, the first and second storage compartments being disposed between the pair of rear frames;
   wherein at least a portion of one of the first and second storage compartments extends in a lateral direction relative to the longitudinal axis beyond the pair of rear frames.

7. The bicycle according to claim 6, wherein a surface of the member guides a storage article into one of the first and second storage compartments.

8. The bicycle according to claim 6, wherein a bottom surface of one of the first and second storage compartments is disposed below an upper surface of the pair of rear frames.

9. The bicycle according to claim 6 further comprising a seat rail disposed above the pair of rear frames and around at least one of the first and second storage compartments.

10. The bicycle according to claim 9 further comprising a connecting member for pivoting the seat between the open position and the closed position, wherein the seat rail is bent in a semi-circular shape and connects to the connecting member.

11. The bicycle according to claim 6 further comprising a charging apparatus having a charging terminal, the charging apparatus being disposed within the bicycle so that when the seat is in the open position the charging terminal is accessible, and when the seat is in the closed position the charging terminal is hidden by the seat.

* * * * *

UNITED STATES PATENT AND TRADEMARK OFFICE
CERTIFICATE OF CORRECTION

PATENT NO. : 7,604,078 B2  Page 1 of 1
APPLICATION NO. : 11/484172
DATED : October 20, 2009
INVENTOR(S) : Okamoto et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 635 days.

Signed and Sealed this

Fifth Day of October, 2010

David J. Kappos
*Director of the United States Patent and Trademark Office*